United States Patent
Yin

(10) Patent No.: US 11,948,228 B2
(45) Date of Patent: Apr. 2, 2024

(54) COLOR CORRECTION METHOD FOR PANORAMIC IMAGE AND ELECTRONIC DEVICE

(71) Applicant: ARASHI VISION INC., Shenzhen (CN)

(72) Inventor: Chenglong Yin, Shenzhen (CN)

(73) Assignee: ARASHI VISION INC., Shenzhen (CN)

( * ) Notice: Subject to any disclaimer, the term of this patent is extended or adjusted under 35 U.S.C. 154(b) by 761 days.

(21) Appl. No.: 17/044,305

(22) PCT Filed: Mar. 6, 2019

(86) PCT No.: PCT/CN2019/077107
§ 371 (c)(1),
(2) Date: Sep. 30, 2020

(87) PCT Pub. No.: WO2019/184667
PCT Pub. Date: Oct. 3, 2019

(65) Prior Publication Data
US 2021/0166440 A1 Jun. 3, 2021

(30) Foreign Application Priority Data
Mar. 30, 2018 (CN) .......... 201810294787.5

(51) Int. Cl.
*G06T 11/00* (2006.01)
*G06T 3/00* (2006.01)
(Continued)

(52) U.S. Cl.
CPC .......... *G06T 11/001* (2013.01); *G06T 3/0018* (2013.01); *G06T 7/90* (2017.01); *G06V 10/56* (2022.01)

(58) Field of Classification Search
CPC ....... G06T 7/90; G06T 11/001; G06T 3/0018; G06T 5/008; G06T 3/0081; G06T 3/4038;
(Continued)

(56) References Cited

U.S. PATENT DOCUMENTS

2018/0035047 A1 2/2018 Lei et al.

FOREIGN PATENT DOCUMENTS

| CN | 103189796 A | 7/2013 |
|----|-------------|--------|
| CN | 106210535 A | 12/2016 |

(Continued)

OTHER PUBLICATIONS

Heuvel, et al. (Calibration of Fisheye Camera Systems and the Reduction of Chromatic Aberration), pp. 1-6. (Year: 2006).*
(Continued)

*Primary Examiner* — Daniel G Mariam
(74) *Attorney, Agent, or Firm* — Cheng-Ju Chiang

(57) ABSTRACT

A color correction method for a panoramic image comprises: acquiring a first and second fisheye images; expanding the first fisheye image and the second fisheye image respectively to obtain a first image and a second image in an RGB color space; calculating overlapping areas between the images; converting the first image and the second image from the RGB color space to a Lab color space; in the Lab color space, adjusting the brightness value of the first image and the brightness value of the second image; converting the first image and the second image from the Lab color space to the RGB color space; according to the mean color values of a first and second overlapping areas, adjusting the color value of the second image by using the first image as a reference, or adjusting the color value of the first image by using the second image as a reference.

15 Claims, 2 Drawing Sheets

(51) Int. Cl.
  *G06T 7/90* (2017.01)
  *G06V 10/56* (2022.01)
(58) Field of Classification Search
  CPC .......... G06T 2207/10024; G06T 2207/20076; H04N 1/60; G06V 10/56
  See application file for complete search history.

(56) References Cited

FOREIGN PATENT DOCUMENTS

| CN | 106373091 A | 2/2017 |
|---|---|---|
| CN | 106713716 A | 5/2017 |
| CN | 106713755 A | 5/2017 |
| CN | 107403408 A | 11/2017 |
| CN | 107492125 A | 12/2017 |
| CN | 108550106 A | 9/2018 |

OTHER PUBLICATIONS

Song Yu, "Utilizing Lab Effect to Adjust Pictures", Photoshop CC2015 Digital Photography Post—Processing Concise Practical Tutorial, Sep. 30, 2016, pp. 266-270, Anhui University Press, Hefei, Anhui, China.

Zhenghua Yang, "3.7.3 Use rgb Mode to Set Colors", Dynamic Web Design Case Study, Sep. 30, 2001, p. 102, Zhongke Multimedia Electronic Publishing House.

Yunbo Liu, "Research on Key Technologies of Full Image Mosaics", China Master's Theses Full-text Database, Jan. 15, 2014, pp. 36-57, Issue I, China Academic Journal Electronic Publishing House, Beijing, China.

Lei Yang, Long Ren, Qing Liu, Hua Wang, Zuofeng Zhou, Jianzhong Cao, "Research and Implementation of Large Field Image Real-Time Mosaic Technology Based on FPGA", Infrared and Laser Engineering, Jun. 30, 2015, pp. 1929-1935, vol. 44, Issue No. 6.

* cited by examiner

COLOR CORRECTION METHOD FOR PANORAMIC IMAGE AND ELECTRONIC DEVICE

CROSS REFERENCE TO RELATED APPLICATIONS

The present application is a 35 U.S.C. § 371 National Phase conversion of International (PCT) Patent Application No. PCT/CN2019/077107, filed on Mar. 6, 2019, which claims priority of Chinese Patent Application No. 201810294787.5, filed on Mar. 30, 2018, the disclosure of which is incorporated by reference herein. The PCT International Patent Application was filed and published in Chinese.

FIELD OF THE INVENTION

The present invention relates generally to the field of panoramic images, and particularly relates to a color correction method for a panoramic image and an electronic device.

BACKGROUND OF THE INVENTION

With the development of science and technology, the application of panoramic images has become more and more popular. The panoramic image can provide a 360-degree panoramic image, giving users an immersive experience. Generally speaking, a panoramic image is composed of two or more photos stitched together. However, due to the influence of the environment, the brightness and color of the photos may be very different, as a result, the stitched panoramic images have obvious stitching traces, and look very unnatural. Therefore, color correction is the key in the panoramic image stitching process.

SUMMARY OF THE INVENTION

The problem solved by the present invention is to provide a color correction method for a panoramic image, a computer-readable storage medium and an electronic device, which can make the stitched panoramic image transition smoother and look more natural.

According to a first aspect, the present invention provides a color correction method for a panoramic image, comprising steps of:
  acquiring a first fisheye image and a second fisheye image;
  expanding the first fisheye image to obtain a first image in an RGB color space, and expanding the second fisheye image to obtain a second image in the RGB color space;
  calculating overlapping areas between the first image and the second image;
  converting the first image and the second image from the RGB color space to a Lab color space;
  in the Lab color space, according to the mean luminance value of a first overlapping area and the mean luminance value of a second overlapping area, adjusting the luminance value of the first image and the luminance value of the second image to reduce the luminance difference between the first image and the second image; where the first overlapping area being an overlapping area between the first image and the second image on the first image, and the second overlapping area being an overlapping area between the first image and the second image on the second image;
  converting the first image of which the luminance value is adjusted and the second image of which the luminance value is adjusted from the Lab color space to the RGB color space; and
  in the RGB color space, according to the mean color value of a first overlapping area and the mean color value of a second overlapping area, adjusting the color value of the second image by using the first image as a reference, or adjusting the color value of the first image by using the second image as a reference.

According to a second aspect, the present invention provides a computer-readable storage medium that stores a computer program or computer programs, which when being executed by a processor or processors, cause the processor or processors to perform steps of the above-mentioned color correction method for a panoramic image.

According to a third aspect, the present invention provides an electronic device, comprising:
  one or more processors;
  a memory; and
  one or more computer programs where the one or more computer programs are stored in the memory and are configured to be executed by the one or more processors, and when executed by the one or more processors, cause the one or more processors to perform steps of the above-mentioned color correction method for a panoramic image.

In the present invention, acquiring a first fisheye image and a second fisheye image; expanding the first fisheye image to obtain a first image in an RGB color space, and expanding the second fisheye image to obtain a second image in the RGB color space; calculating overlapping areas between the first image and the second image; converting the first image and the second image from the RGB color space to a Lab color space; in the Lab color space, according to the mean luminance value of a first overlapping area and the mean luminance value of a second overlapping area, adjusting the luminance value of the first image and the luminance value of the second image to reduce the luminance difference between the first image and the second image; converting the first image of which the luminance value is adjusted and the second image of which the luminance value is adjusted from the Lab color space to the RGB color space; in the RGB color space, according to the mean color value of a first overlapping area and the mean color value of a second overlapping area, adjusting the color value of the second image by using the first image as a reference, or adjusting the color value of the first image by using the second image as a reference. Hence, in the present invention, by first adjusting the luminance value and then the color value, thus reducing the traces in the image stitching process, thereby, the panoramic image obtained after stitching seems more natural.

DETAILED DESCRIPTION OF THE INVENTION

The foregoing objects, technical solutions and advantages of the invention will be much clearer from the following detail description taken with the accompanying drawings and embodiments. It should be understood that the specific embodiments described herein are only used to explain the present invention and are not intended to limit the present invention.

In order to explain the technical solutions of the present invention, the following will be described by specific embodiments.

First Embodiment

Figure 1:
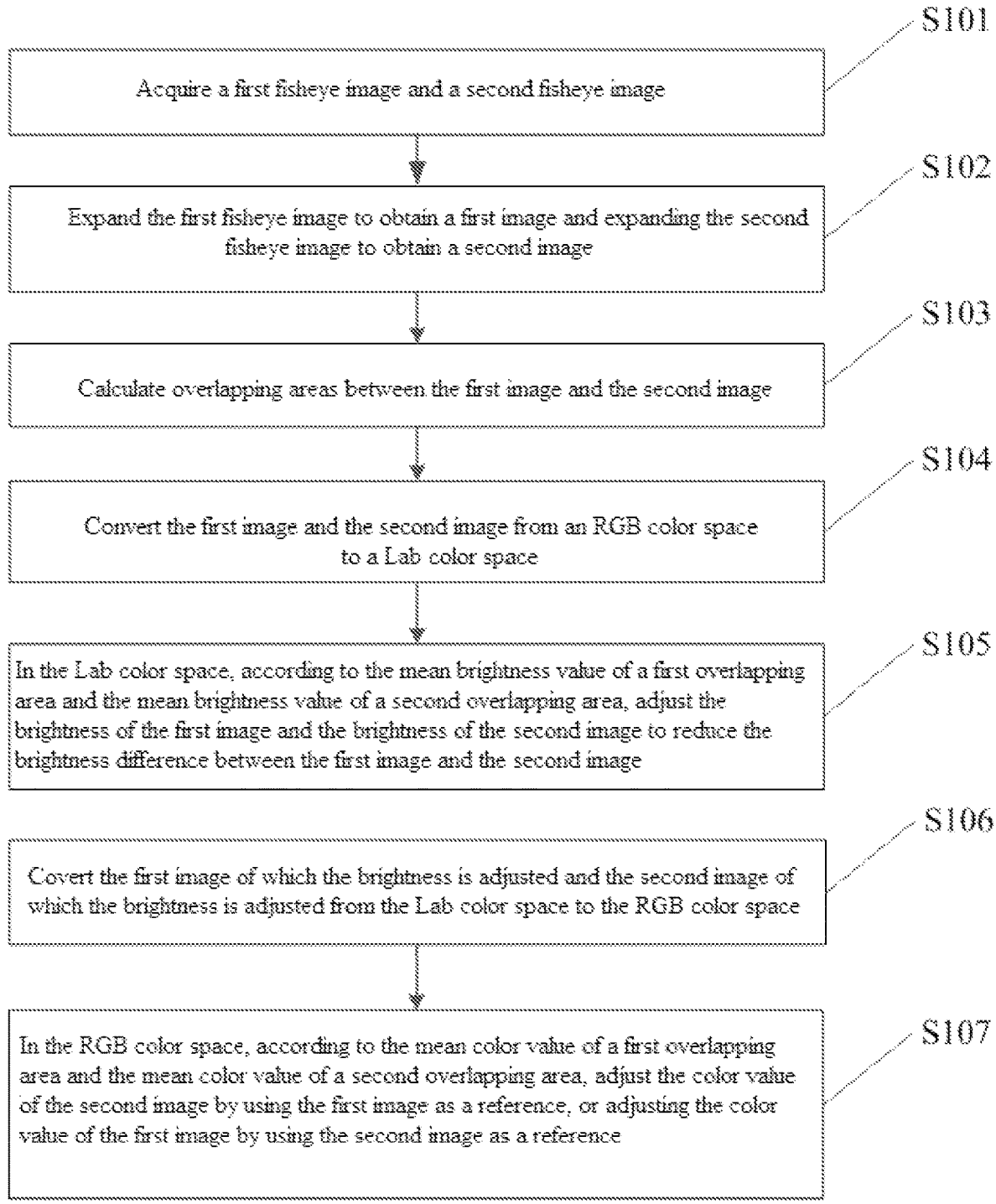
FIG. 1 is a flowchart of a color correction method for a panoramic image in accordance with a first embodiment of the present invention.

Referring to FIG. 1, a color correction method for a panoramic image provided in the first embodiment of the present invention, comprises the following steps: it should be noted that if there are substantially the same results, these steps of the color correction method for a panoramic image of the present invention do not necessarily need to be performed in the order illustrated in FIG. 1.

S101, acquiring a first fisheye image and a second fisheye image.

Specifically, acquiring a first fisheye image and a second fisheye image through a fisheye camera or an electronic device with a fisheye lens.

S102, expanding the first fisheye image to obtain a first image in an RGB color space, and expanding the second fisheye image to obtain a second image in the RGB color space.

Specifically, expanding the first and the second fisheye images according to the intrinsic parameters, the extrinsic parameters, and the distortion parameters, respectively; and not by way of limitation here.

S103, calculating overlapping areas between the first image and the second image.

Specifically, calculating overlapping areas according to feature matching or correlation matching, and not by way of limitation here.

S104, converting the first image and the second image from the RGB color space to a Lab color space.

In RGB color space, the three color channels of red (R), green (G), and blue (B) are changed or added together in various way to reproduce a broad array of colors. The RGB has three channels: red channel, green channel and blue channel, can reproduce almost all the colors human visually perceived, and is one of the most widely used color systems currently.

Lab is a color model that has nothing to do with the equipment, and it is also a color model based on physiological characteristics. Lab expresses three values: one is luminance (L), the others a and b are two color channels, a includes colors from dark green (low luminance value) to gray (medium luminance value) to bright pink (High luminance value); b includes colors from bright blue (low luminance value) to gray (medium luminance value) to yellow (high luminance value).

Specifically, using the XYZ color space, the first image and the second image can be converted from the RGB color space to the XYZ color space, and then converted form the XYZ color space to the Lab color space, and not by way of limitation here.

S105, in the Lab color space, according to the mean luminance value of a first overlapping area and the mean luminance value of a second overlapping area, adjusting the luminance value of the first image and the luminance value of the second image to reduce the luminance difference between the first image and the second image.

Where the first overlapping area is an overlapping area between the first image and the second image on the first image, and the second overlapping area is an overlapping area between the first image and the second image on the second image. In addition, it should be noted that the overlapping area may be the entire overlapping area between the first image and the second image, or may be a partial overlapping area, such as the overlapping area of a specific feature, which is not limited here.

In the first embodiment of the present invention, adjusting the luminance value of the first image and the luminance value of the second image to reduce the luminance difference between the first image and the second image, by means of but not limited to the following formula:

$$L_1' = L_1 * \frac{L_{mean1} + L_{mean2}}{2 * L_{mean1}};$$

$$L_2' = L_2 * \frac{L_{mean1} + L_{mean2}}{2 * L_{mean2}}$$

where, $L_{mean1}$ represents the mean luminance value of the first overlapping area;

$L_{mean2}$ represents the mean luminance value of the second overlapping area;

$L_1$ represents the luminance value of the first image before being adjusted;

$L_{1'}$ represents the luminance value of the first image after being adjusted;

$L_2$ represents the luminance value of the second image before being adjusted;

$L_2'$ represents the luminance value of the second image after being adjusted.

S106, converting the first image of which the luminance value is adjusted and the second image of which the luminance value is adjusted from the Lab color space to the RGB color space.

S107, in the RGB color space, according to the mean color value of a first overlapping area and the mean color value of a second overlapping area, adjusting the color value of the second image by using the first image as a reference, or adjusting the color value of the first image by using the second image as a reference.

Where, the mean color value is the mean color value of each channel of R, G, and B.

In the first embodiment of the present invention, adjusting the color value of the second image by using the first image as a reference, by means of but not limited to the following formula:

$$\begin{cases} rgGain = \frac{R_{mean1}}{G_{mean1}} \Big/ \frac{R_{mean2}}{G_{mean2}} \\ bgGain = \frac{B_{mean1}}{G_{mean1}} \Big/ \frac{B_{mean2}}{G_{mean2}} \end{cases}$$

$$\begin{cases} R_2' = R_2 * rgGain \\ G_2' = G_2 \\ B_2' = B_2 * bgGain \end{cases}$$

Where, $R_{mean1}$, $G_{mean1}$, $B_{mean1}$ are the mean color values of the first overlapping area;

$R_{mean2}$, $G_{mean2}$, $B_{mean2}$ are the mean color values of the second overlapping area;

rgGain is the adjustment parameter of R channel;

bgGain is the adjustment parameter of B channel;

$R_2$ is the color value of R channel of the second image before being adjusted;

$R_{2'}$ is the color value of R channel of the second image after being adjusted;

$G_2$ is the color value of G channel of the second image before being adjusted;

$G_{2'}$ is the color value of G channel of the second image after being adjusted;

$B_2$ is the color value of B channel of the second image before being adjusted;

$B_{2'}$ is the color value of B channel of the second image after being adjusted.

It can be understood that it is only necessary to appropriately modify the above formula to adjust the color value of the first image by using the second image as a reference, which will not be repeated here.

In the first embodiment of the present invention, acquiring a first fisheye image and a second fisheye image; expanding the first fisheye image to obtain a first image in an RGB color space, and expanding the second fisheye image to obtain a second image in the RGB color space; calculating overlapping areas between the first image and the second image; converting the first image and the second image from the RGB color space to a Lab color space; in the Lab color space, according to the mean luminance value of a first overlapping area and the mean luminance value of a second overlapping area, adjusting the luminance value of the first image and the luminance value of the second image to reduce the luminance difference between the first image and the second image; converting the first image of which the luminance value is adjusted and the second image of which the luminance value is adjusted from the Lab color space to the RGB color space; in the RGB color space, according to the mean color value of a first overlapping area and the mean color value of a second overlapping area, adjusting the color value of the second image by using the first image as a reference, or adjusting the color value of the first image by using the second image as a reference. Hence, in the present invention, by first adjusting the luminance value and then the color value, thus reducing the traces in the image stitching process, thereby, the panoramic image obtained after stitching seems more natural.

Second Embodiment

The second embodiment of the present invention provides a computer-readable storage medium that stores a computer program or computer programs including a set of computer-executable instructions, which when being executed by a processor or processors, cause the processor or processors to perform steps of the color correction method for a panoramic image provided in the first or second embodiment of the present invention.

Third Embodiment

Figure 2:
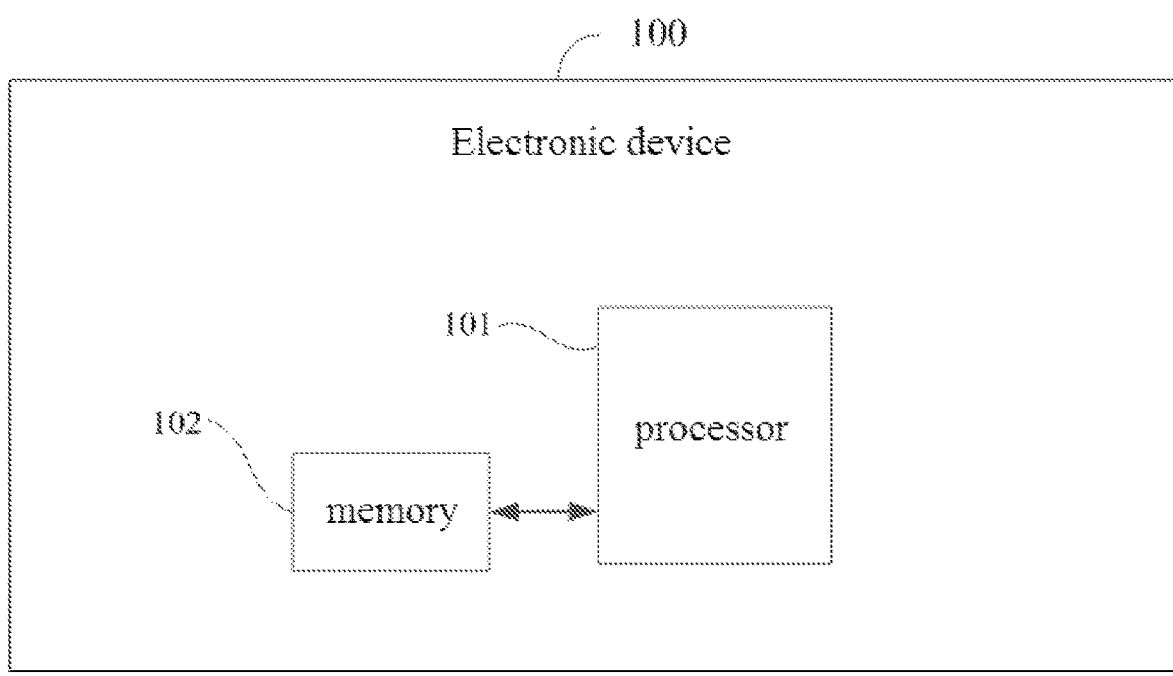
FIG. 2 is a schematic structural diagram of an electronic device in accordance with a third embodiment of the present invention.

Based on the same inventive concept, the third embodiment of the present invention provides an electronic device. FIG. 2 illustrates a structural block diagram of an electronic device provided in the third embodiment of the present invention. An electronic device 100 comprises: one or more processors 101, a memory 102, and one or more computer programs, where the one or more processors 101 and the memory 102 are connected by a bus, the one or more computer programs including a set of computer-executable instructions are stored in the memory 102, and are configured to be executed by the one or more processors 101. The one or more processors 101 execute the one or more computer programs to perform steps of the color correction method for a panoramic image provided in the first embodiment of the present invention.

It should be noted that the electronic device can be any electronic device such as a fisheye camera, a mobile phone, a tablet computer, a PDA (Personal Digital Assistant), an on-board computer, a smart watch, etc.

Such terms "first", "second", "third", "fourth", etc. (if present) in the specification, claims and accompanying drawing of the present invention, are used to distinguish similar subjects, and do not have to be used to describe a particular order. It should be understood that such numbers used in this way can be interchanged under appropriate circumstances so that the embodiments described herein can be implemented in an order other than the content illustrated or described herein.

A person of ordinary skill in the art may understand that all or part of the steps in the method of the above-mentioned embodiments can be implemented by a program or programs instructing relevant hardware. The program or programs can be stored in a computer-readable storage medium, and the storage media may comprise: Read Only Memory (ROM), Random Access Memory (RAM), magnetic disk or CD, etc.

The above descriptions are only preferred embodiments of the present invention and are not intended to limit the present invention. Any modification, equivalent replacements and improvement made within the spirit and principle of the present invention shall be included in the protection of the present invention.

What is claimed is:

1. A color correction method for a panoramic image, comprising steps of:

acquiring a first fisheye image and a second fisheye image;

unwrapping the first fisheye image to obtain a first image in an RGB color space, and unwrapping the second fisheye image to obtain a second image in the RGB color space;

calculating overlapping areas between the first image and the second image;

converting the first image and the second image from the RGB color space to a Lab color space;

in the Lab color space, according to the mean luminance value of a first overlapping area and the mean luminance value of a second overlapping area, adjusting the luminance value of the first image and the luminance value of the second image to reduce the luminance difference between the first image and the second image; where the first overlapping area being an overlapping area between the first image and the second image on the first image, and the second overlapping area being an overlapping area between the first image and the second image on the second image;

converting the first image of which the luminance value is adjusted and the second image of which the luminance value is adjusted from the Lab color space to the RGB color space; and in the RGB color space, according to the mean color value of a first overlapping area and the mean color value of a second overlapping area, adjusting the color value of the second image by using the first image as a reference, or adjusting the color value of the first image by using the second image as a reference.

2. The method of claim 1, wherein the step of according to the mean luminance value of a first overlapping area and the mean luminance value of a second overlapping area, adjusting the luminance value of the first image and the luminance value of the second image to reduce the luminance difference between the first image and the second image, comprises, adjusting the luminance value of the first image and the luminance value of the second image to reduce the luminance difference between the first image and the second image by means of the following formula:

$$L'_1 = L_1 * \frac{L_{mean1} + L_{mean2}}{2 * L_{mean1}};$$

$$L'_2 = L_2 * \frac{L_{mean1} + L_{mean2}}{2 * L_{mean2}};$$

where, $L_{mean1}$ represents the mean luminance value of the first overlapping area;
$L_{mean2}$ represents the mean luminance value of the second overlapping area;
$L_1$ represents the luminance value of the first image before being adjusted;
$L'_1$ represents the luminance value of the first image after being adjusted;
$L_2$ represents the luminance value of the second image before being adjusted;
$L'_2$ represents the luminance value of the second image after being adjusted.

3. The method of claim 2, wherein the step of according to the mean color value of a first overlapping area and the mean color value of a second overlapping area, adjusting the color value of the second image by using the first image as a reference, comprises, adjusting the color value of the second image by means of the following formula:

$$\begin{cases} rgGain = \frac{R_{mean1}}{G_{mean1}} / \frac{R_{mean2}}{G_{mean2}} \\ bgGain = \frac{B_{mean1}}{G_{mean1}} / \frac{B_{mean2}}{G_{mean2}} \end{cases};$$

$$\begin{cases} R'_2 = R_2 * rgGain \\ G'_2 = G_2 \\ B'_2 = B_2 * bgGain \end{cases};$$

where, $R_{mean1}$, $G_{mean1}$ and $B_{mean1}$ are the mean color values of the first overlapping area;
$R_{mean2}$, $G_{mean2}$, $B_{mean2}$ are the mean color values of the second overlapping area;
rgGain is the adjustment parameter of R channel;
bgGain is the adjustment parameter of B channel;
$R_2$ is the color value of R channel of the second image before being adjusted;
$R_2'$ is the color value of R channel of the second image after being adjusted;
$G_2$ is the color value of G channel of the second image before being adjusted;
$G_2'$ is the color value of G channel of the second image after being adjusted;
$B_2$ is the color value of B channel of the second image before being adjusted;
$B_2'$ is the color value of B channel of the second image after being adjusted.

4. The method of claim 3, wherein the step of unwrapping the first fisheye image to obtain a first image in an RGB color space, and unwrapping the second fisheye image to obtain a second image in the RGB color space, specifically is:
unwrapping the first fisheye image to obtain a first image in an RGB color space and unwrapping the second fisheye image to obtain a second image in the RGB color space according to using intrinsic parameters, extrinsic parameters, and distortion parameters, respectively.

5. The method of claim 1, wherein the step of unwrapping the first fisheye image to obtain a first image in an RGB color space, and unwrapping the second fisheye image to obtain a second image in the RGB color space, specifically is:
unwrapping the first fisheye image to obtain a first image in an RGB color space and unwrapping the second fisheye image to obtain a second image in the RGB color space according to intrinsic parameters, extrinsic parameters, and distortion parameters, respectively.

6. The method of any of claim 1, wherein acquiring a first fisheye image and a second fisheye image through a fisheye camera or an electronic device with a fisheye lens.

7. The method of claim 1, wherein in the steps of the first overlapping area being an overlapping area between the first image and the second image on the first image, and the second overlapping area being an overlapping area between the first image and the second image on the second image;
where the overlapping area is an entire or a partial overlapping area between the first image and the second image.

8. The method of claim 1, wherein the step of calculating overlapping areas between the first image and the second image, specifically is:
calculating overlapping areas according to feature matching or correlation matching.

9. The method of claim 2, wherein the step of unwrapping the first fisheye image to obtain a first image in an RGB color space, and unwrapping the second fisheye image to obtain a second image in the RGB color space, specifically is:
unwrapping the first fisheye image to obtain a first image in an RGB color space and unwrapping the second fisheye image to obtain a second image in the RGB color space according to using intrinsic parameters, extrinsic parameters, and distortion parameters, respectively.

10. A non-transitory computer-readable storage medium that stores one or more computer programs including a set of computer-executable instructions, wherein when being executed by one or more processors, cause the one or more processors to perform steps of a color correction method for a panoramic image, comprising:
acquiring a first fisheye image and a second fisheye image;
unwrapping the first fisheye image to obtain a first image in an RGB color space, and unwrapping the second fisheye image to obtain a second image in the RGB color space;
calculating overlapping areas between the first image and the second image;
converting the first image and the second image from the RGB color space to a Lab color space;
in the Lab color space, according to the mean luminance value of a first overlapping area and the mean luminance value of a second overlapping area, adjusting the luminance value of the first image and the luminance value of the second image to reduce the luminance difference between the first image and the second image; where the first overlapping area being an overlapping area between the first image and the second image on the first image, and the second overlapping area being an overlapping area between the first image and the second image on the second image;

converting the first image of which the luminance value is adjusted and the second image of which the luminance value is adjusted from the Lab color space to the RGB color space; and in the RGB color space, according to the mean color value of a first overlapping area and the mean color value of a second overlapping area, adjusting the color value of the second image by using the first image as a reference, or adjusting the color value of the first image by using the second image as a reference.

11. The storage medium of claim 10, wherein the step of according to the mean luminance value of a first overlapping area and the mean luminance value of a second overlapping area, adjusting the luminance value of the first image and the luminance value of the second image to reduce the luminance difference between the first image and the second image, comprises, adjusting the luminance value of the first image and the luminance value of the second image to reduce the luminance difference between the first image and the second image by means of the following formula:

$$L_1' = L_1 * \frac{L_{mean1} + L_{mean2}}{2 * L_{mean1}};$$

$$L_2' = L_2 * \frac{L_{mean1} + L_{mean2}}{2 * L_{mean2}};$$

where, $L_{mean1}$ represents the mean luminance value of the first overlapping area;

$L_{mean2}$ represents the mean luminance value of the second overlapping area;

$L_1$ represents the luminance value of the first image before being adjusted;

$L_1'$ represents the luminance value of the first image after being adjusted;

$L_2$ represents the luminance value of the second image before being adjusted;

$L_2'$ represents the luminance value of the second image after being adjusted.

12. The storage medium of claim 10, wherein the step of according to the mean color value of a first overlapping area and the mean color value of a second overlapping area, adjusting the color value of the second image by using the first image as a reference, comprises, adjusting the color value of the second image by means of the following formula:

$$\begin{cases} rgGain = \frac{R_{mean1}}{G_{mean1}} / \frac{R_{mean2}}{G_{mean2}} \\ bgGain = \frac{B_{mean1}}{G_{mean1}} / \frac{B_{mean2}}{G_{mean2}} \end{cases};$$

$$\begin{cases} R_2' = R_2 * rgGain \\ G_2' = G_2 \\ B_2' = B_2 * bgGain \end{cases};$$

Where, $R_{mean1}$, $G_{mean1}$ and $B_{mean1}$ are the mean color values of the first overlapping area;

$R_{mean1}$, $G_{mean2}$, $B_{mean2}$ are the mean color values of the second overlapping area;

rgGain is the adjustment parameter of R channel;
bgGain is the adjustment parameter of B channel;

$R_2$ is the color value of R channel of the second image before being adjusted;

$R_2'$ is the color value of R channel of the second image after being adjusted;

$G_2$ is the color value of G channel of the second image before being adjusted;

$G_2'$ is the color value of G channel of the second image after being adjusted;

$B_2$ is the color value of B channel of the second image before being adjusted;

$B_2'$ is the color value of B channel of the second image after being adjusted.

13. An electronic device, comprising:
one or more processors;
a memory; and
one or more computer programs including a set of computer-executable instructions that are stored in the memory and are configured to be executed by the one or more processors, wherein the set of computer-executable instructions are executed by the one or more processors, cause the one or more processors to perform steps of a color correction method for a panoramic image, comprising:

acquiring a first fisheye image and a second fisheye image;

unwrapping the first fisheye image to obtain a first image in an RGB color space, and unwrapping the second fisheye image to obtain a second image in the RGB color space;

calculating overlapping areas between the first image and the second image;

converting the first image and the second image from the RGB color space to a Lab color space;

in the Lab color space, according to the mean luminance value of a first overlapping area and the mean luminance value of a second overlapping area, adjusting the luminance value of the first image and the luminance value of the second image to reduce the luminance difference between the first image and the second image; where the first overlapping area being an overlapping area between the first image and the second image on the first image, and the second overlapping area being an overlapping area between the first image and the second image on the second image;

converting the first image of which the luminance value is adjusted and the second image of which the luminance value is adjusted from the Lab color space to the RGB color space; and in the RGB color space, according to the mean color value of a first overlapping area and the mean color value of a second overlapping area, adjusting the color value of the second image by using the first image as a reference, or adjusting the color value of the first image by using the second image as a reference.

14. The electronic device of claim 13, wherein the step of according to the mean luminance value of a first overlapping area and the mean luminance value of a second overlapping area, adjusting the luminance value of the first image and the luminance value of the second image to reduce the luminance difference between the first image and the second image, comprises, adjusting the luminance value of the first image and the luminance value of the second image to reduce the luminance difference between the first image and the second image by means of the following formula:

$$L_1' = L_1 * \frac{L_{mean1} + L_{mean2}}{2 * L_{mean1}};$$

$$L_2' = L_2 * \frac{L_{mean1} + L_{mean2}}{2 * L_{mean2}};$$

where, $L_{mean1}$ represents the mean luminance value of the first overlapping area;

$L_{mean2}$ represents the mean luminance value of the second overlapping area;

$L_1$ represents the luminance value of the first image before being adjusted;

$L_1'$ represents the luminance value of the first image after being adjusted;

$L_2$ represents the luminance value of the second image before being adjusted;

$L_2'$ represents the luminance value of the second image after being adjusted.

15. The electronic device of claim 13, wherein the step of according to the mean color value of a first overlapping area and the mean color value of a second overlapping area, adjusting the color value of the second image by using the first image as a reference, comprises, adjusting the color value of the second image by means of the following formula:

$$\begin{cases} rgGain = \frac{R_{mean1}}{G_{mean1}} \Big/ \frac{R_{mean2}}{G_{mean2}} \\ bgGain = \frac{B_{mean1}}{G_{mean1}} \Big/ \frac{B_{mean2}}{G_{mean2}} \end{cases};$$

$$\begin{cases} R_2' = R_2 * rgGain \\ G_2' = G_2 \\ B_2' = B_2 * bgGain \end{cases};$$

Where, $R_{mean1}$, $G_{mean1}$ and $B_{mean1}$ are the mean color values of the first overlapping area;

$R_{mean2}$, $G_{mean2}$, $B_{mean2}$ are the mean color values of the second overlapping area;

rgGain is the adjustment parameter of R channel;

bgGain is the adjustment parameter of B channel;

$R_2$ is the color value of R channel of the second image before being adjusted;

$R_2'$ is the color value of R channel of the second image after being adjusted;

$G_2$ is the color value of G channel of the second image before being adjusted;

$G_2'$ is the color value of G channel of the second image after being adjusted;

$B_2$ is the color value of B channel of the second image before being adjusted;

$B_2'$ is the color value of B channel of the second image after being adjusted.

\* \* \* \* \*